July 15, 1969     R. H. WATTS ET AL     3,455,115

FLOATING STRUCTURES

Filed April 20, 1966     9 Sheets-Sheet 1

INVENTORS
ROBERT H. WATTS &
WALTER E. ELLIS,

BY Yungblut, Melville, Strasser and Foster
ATTORNEYS

July 15, 1969  R. H. WATTS ET AL  3,455,115
FLOATING STRUCTURES
Filed April 20, 1966  9 Sheets-Sheet 2

INVENTOR
ROBERT H. WATTS &
WALTER E. ELLIS,

BY *Yungblut, Melville, Strasser and Foster*
ATTORNEYS

July 15, 1969

R. H. WATTS ET AL 3,455,115

FLOATING STRUCTURES

Filed April 20, 1966

INVENTORS
ROBERT H. WATTS &
WALTER E. ELLIS,

BY *Yungblut, Melville, Strasser and Foster*
ATTORNEYS

July 15, 1969　　R. H. WATTS ET AL　　3,455,115
FLOATING STRUCTURES
Filed April 20, 1966　　9 Sheets-Sheet 7

INVENTOR
ROBERT H. WATTS &
WALTER E. ELLIS,
BY Yungblut, Melville, Strasser and Foster
ATTORNEYS

July 15, 1969  R. H. WATTS ET AL  3,455,115
FLOATING STRUCTURES
Filed April 20, 1966  9 Sheets-Sheet 8

INVENTORS
ROBERT H. WATTS &
WALTER E. ELLIS,
BY Yungblut, Melville, Strasser and Foster
ATTORNEYS July 15, 1969   R. H. WATTS ET AL   3,455,115
FLOATING STRUCTURES Filed April 20, 1966   9 Sheets-Sheet 9

INVENTORS
ROBERT H. WATTS &
WALTER E. ELLIS,
BY Yungblut, Melville, Strasser and Foster
ATTORNEYS United States Patent Office 3,455,115
Patented July 15, 1969

3,455,115
FLOATING STRUCTURES
Robert H. Watts, 5760 Beech Grove Lane 45238, and Walter E. Ellis, 6235 Hawk Ridge Road 45243, both of Cincinnati, Ohio
Filed Apr. 20, 1966, Ser. No. 543,959
Int. Cl. E02b *3/20;* B63b *35/00;* E01d *15/14*
U.S. Cl. 61—48                                26 Claims

ABSTRACT OF THE DISCLOSURE

An elongated planar platform structure twistable about a lengthwise axis having braces extending transversely and in spaced relation, and torsion bar means extending substantially the length of said platform structure and interconnecting said transverse braces to prevent substantial twisting of said platform structure about its lengthwise axis.

---

The invention relates to floating structures such as piers, platforms and the like, and more particularly to a modular design for such structures wherein the individual elements are of a construction imparting great stability.

Heretofore floating docks, piers, platforms and the like have been made of varying materials including wood, concrete, metal and the like. Such structures often include an elongated main dock portion (often termed a header dock) and a plurality of laterally extending dock elements (often called fingers) between which water craft may be moored. Generally, the header dock and the fingers comprise horizontal platform members supported by flotation means. The flotation means range from oil drums and the like to foamed plastic pontoons.

Floating structures of the type described, being supported by a fluid medium, often display undesirable twisting characteristics when subjected to an unevenly distributed live load. For example, when a finger is subjected to a load near its edge, and particularly nears its free end, it will have a tendency to twist about its long axis. Often such twisting may be sufficiently severe to cause a drastic tilting of the finger, particularly near its free end. In such instances, persons standing on the finger, or objects supported by the finger may be caused to fall or slide off of the structure into the water. Header dock portions and floating platforms and the like are also subject to longitudinal twisting when the load borne thereby is not evenly distributed.

In the past, a number of expedients have been attempted to avoid such twisting in floating structures. For example, floating structures have been adjustably affixed to piles sunk into the bed or bottom of the body of water. In some instances, adjacent fingers of a dock structure have been connected together by complex overwater or underwater structures. While such expedients may diminish the twisting characteristics of the floating structure, their cost is prohibitive, and they tend to limit the type of boat which may be moored between fingers.

The prior art has also made use of bulky and complex cantilever brace work above or beneath the platforms of floating structures. While twisting may be alleviated, the amount of material used is great, the construction and maintenance costs are high and the utility value is low.

It is therefore a primary object of the present invention to provide a horizontal surface to be supported or suspended in a fluid medium and which will resist those forces tending to cause a twist therein even when unevenly loaded.

It is an object of the present invention to provide in certian embodiments thereof a torsion bar in association with the platform or deck portion of a floating structure.

It is an object of the present invention to provide in certain embodiments thereof means whereby the flotation elements of a floating structure may serve as torsion means to prevent twisting thereof.

It is one of the primary objects of the present invention to provide a floating dock structure of modular design, that is individual components of the dock structure which serve the same function will be interchangeable in such a way that dock structures of various sizes and capacities may be obtained by the combination of these components or modules in building block manner.

It is an object of the present invention to provide a modular floating dock structure for the purpose described which will be easy and inexpensive to manufacture.

It is an object of the present invention to provide a modular floating dock structure wherein the individual elements will remain horizontal despite changes of water level.

It is an object of the present invention to provide a dock structure of the type described wihch is adaptable to shop fabrication.

It is an object of the present invention to provide a modular floating dock structure in which the modules are sufficiently compact for shipment by rail, highway or other modes of transportation, and are adapted to movement by crane or lift truck.

It is an object of the present invention to provide such a dock structure which may be shipped to its ultimate site and which will require a minimum amount of time and labor to perform the final assembly operations at that site.

It is an object of the present invention to provide such a dock structure which may be easily dissambled, stored and reassembled as required by seasonal changes.

These and other objects of the invention which will be described hereinafter or will be apparent to one skilled in the art upon reading these specifications, are accomplished by that structure and arrangement of parts of which exemplary embodiments will now be described. Reference is made to the accompanying drawings wherein:

Figure 1:
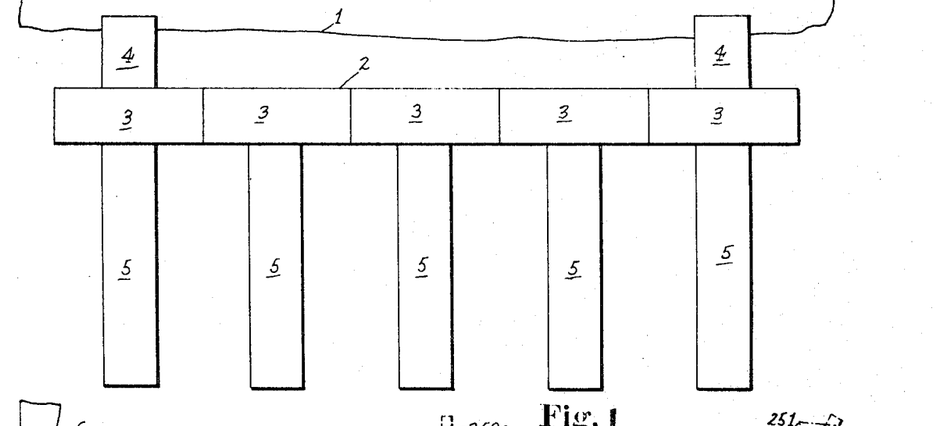
FIG. 1 is a plan view of an exemplary form of floating dock structure wherein the header dock runs substantially parallel to the shore line.

The invention will be described herein in exemplary embodiments constituting dock structures and parts thereof, it being understood that this does not form a limitation on the invention. The principles of the present invention may be applied to platform structures and the like. It will be understood by one skilled in the art that various modules described herein may be combined in any number of ways to form a structure of suitable configuration for the site in which it will be used and of suitable size for the docking capacity desired. FIG. 1 illustrates an exemplary form of floating dock structure of the present invention. In that figure the shoreline is indicated at 1. The header dock assembly is generally indicated at 2 and is made up of a plurality of modules 3. The header dock assembly runs substantially parallel to the shoreline 1 and may be connected therewith by hinged bridge members 4 which will allow for changes in water level. A plurality of finger modules 5 extend laterally of the header dock assembly and substantially perpendicular to the shoreline.

Figure 2:
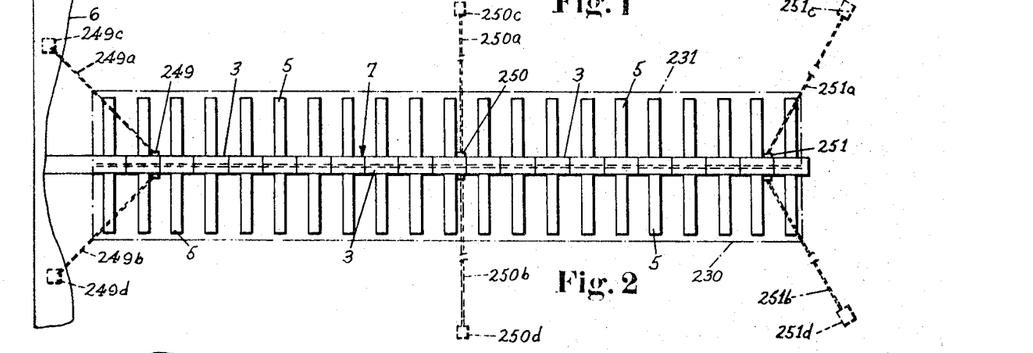
FIG. 2 is a plan view of another exemplary form of floating dock structure wherein the header portion thereof runs substantially perpendicular to the shoreline.

FIG. 2 shows another typical docking structure arrangement. In FIG. 2 the shoreline is indicated at 6, the header dock assembly is indicated generally at 7, and again may be made up of header dock modules 3. In this instance the header dock assembly 7 extends substantially perpendicular to the shoreline, and has affixed thereto a plurality of laterally extending finger modules 5 on both sides. The finger modules 5 lie substantially parallel to the shoreline.

Figure 2A:
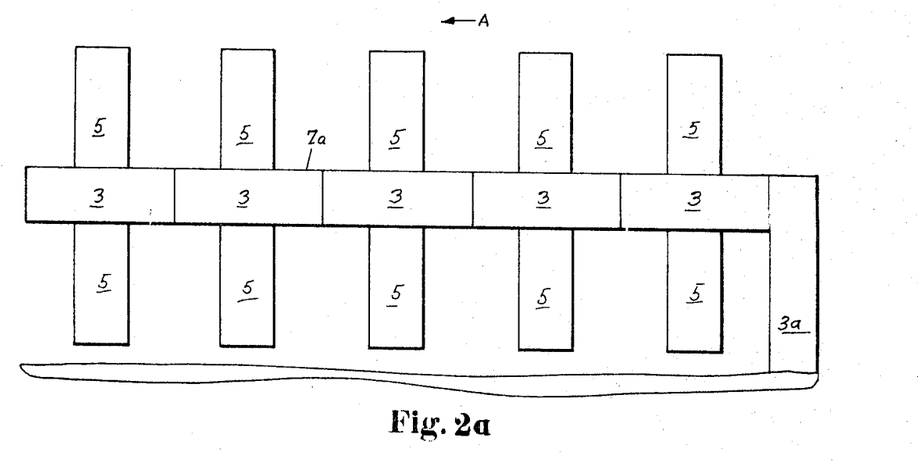
FIG. 2a is a plan view of a dock structure similar to that of FIG. 2 wherein the header dock runs substantially parallel to the shoreline.

FIG. 2a shows a dock structure similar to that of FIG. 2 and made up of header dock modules 3 and finger dock modules 5. In this instance, however, the header dock assembly 7a lies substantially parallel to the shoreline and is connected thereto by a module 3a. Such a trailing installation is particularly adapted for rivers, streams and the like having a current moving in the direction of the arrow A.

In the finger and header dock assemblies, described hereinafter, it will be understood that the materials from which the deck portions are made and the materials of which the flotation elements are constructed do not constitute a limitation on the present invention. For purposes of an exemplary showing, the modules are illustrated as having deck portions made up of interlocking, elongated metallic elements, and the flotation means are illustrated as elongated cylindrical metallic elements which may be filled with foamed plastic or the like.

Figure 3:
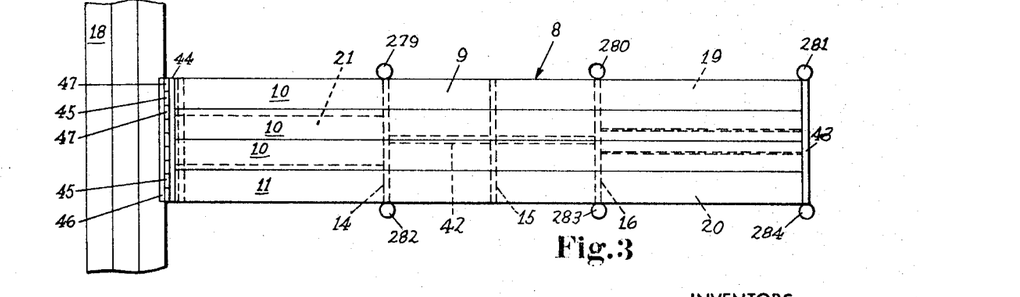
FIG. 3 is a plan view illustrating one form of finger structure.
Figure 4:
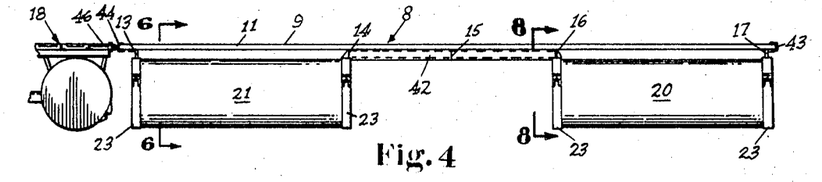
FIG. 4 is a side elevation of the finger of FIG. 3.
Figures 5, 6, 7, 8, 9:
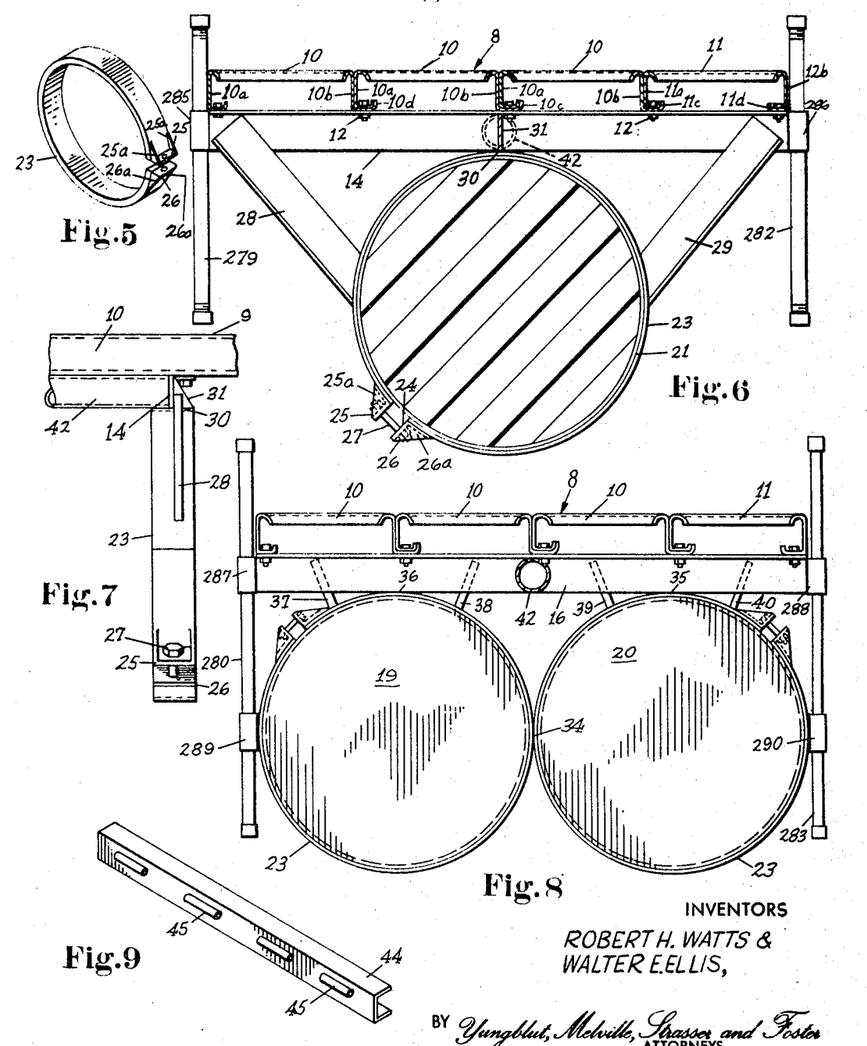
FIG. 5 is a perspective view of a ring clamp of the present invention.
FIG. 6 is a cross sectional view taken along the section line 6—6 of FIG. 4.
FIG. 7 is a fragmentary side elevation showing one of the ring clamps and a portion of the torsion bar used in the structure of FIGS. 3 and 4.
FIG. 8 is a cross sectional view taken along the section line 8—8 of FIG. 4.
FIG. 9 is a perspective view of an exemplary form of hinge member.

FIGS. 3 through 8 illustrate one form of finger module generally indicated at 8. The module 8 comprises a deck portion 9 made up of elongated metallic interlocking members, three of which are shown at 10, and one of which is shown at 11. The deck members 10 are identical, and are provided with longitudinally extending, downwardly depending side flanges 10a and 10b. It will be noted that the downwardly depending flanges 10a and 10b have a hook-like configuration at their lowermost edges (indicated at 10c and 10d respectively). The hook-like configurations 10c and 10d of adjacent deck members 10 are adapted to nest so that the deck members interlock. The deck member 11 is the same as the deck members 10, having downwardly depending edge portions 11a and 11b. The deck member 11 differs from the members 10 only in that while the hook-like configuration 11c on the flange 11a is adapted to nest with the hook-like configuration 10b on the adjacent deck member 10, the hook-like configuration 11d on the flange 11b faces inwardly so as to provide a finished edge at the right side of the deck (as seen in FIG. 6). The hook portions of the deck members 10 and 11 are affixed by means of bolts 12 to a plurality of transverse brace members 13 through 17. The brace members 13 through 17 may be of any suitable shape including channels members, I-beams or the like. For purposes of illustration, the braces 13 through 17 are shown as angle irons. One leg of each angle iron is affixed to the deck structure, the other leg of each angle iron depends downwardly.

The finger module 8 is affixed at one end to a header dock assembly generally indicated at 18, the other end of the finger being free. The free end of the finger has two flotation elements 19 and 20, while the other end of the finger has a single flotation element 21. The flotation elements 19, 20 and 21 comprise elongated cylindrical members which may be made of any suitable material. As illustrated, the flotation elements comprises cylindrical metallic members. The cylindrical flotation elements may be hollow and sealed, or they may be filled with foamed plastic or the like. The flotation element 21 is affixed to the deck structure by means of ring clamps 23.

Referring to FIGS. 5 through 7, the ring clamp 23 is typical of all of the ring clamps hereinafter shown and described, and comprises an annular metallic band. The band 23 is split in at least one place as at 24. The ends of the band are provided with outturned, radially extending portions 25 and 26 which may be integral parts of the band ends, or may be permanently affixed thereto. The outturned portions 25 and 26 may be additionally strengthened by the provision of triangular braces affixed thereto and indicated respectively at 25a and 26a. The portions 25 and 26 have coaxial perforations therein for the receipt of one or more bolts 27 by which the ring clamp or band 23 may be tightened. The ring clamp 23 is permanently affixed to the finger structure by means of braces 28 and 29, welded or bolted at one end to the ring clamp 23 and welded or bolted at the other end to the downwardly depending leg of the angle iron 14. The ring clamp 23 may itself be welded to the angle iron 14 as at 30. This weld may be made even stronger by the provision of a triangular brace 31, one side of which is welded to the angle iron 14, and another side of which is welded to the ring clamp.

It will be understood that the ring clamp 23 at the other end of the flotation element 21 is identical and is affixed to the angle iron 13 in the same manner, including braces equivalent to the braces 28 and 29 in FIG. 6. Further, it will be seen that in the assembly of the finger structure 8, the ends of the flotation element 21 will be firmly engaged by the ring clamps.

FIG. 8 is an end view of the free end of the finger module. The flotation elements 19 and 20 lie in side-by-side relationship. The ends of each of these elements are engaged by ring clamps. The ring clamps 23 in FIG. 8 are identical to the ring clamp 23 in FIG. 6, and like parts have been given like index numerals. In this instance since the ring clamps lie in side-by-side relationship they may be welded together as at 34. They are also welded to the downwardly extending leg of the angle iron 17 as at 35 and 36. The ring clamps may be additionally braced by the members 37 and 38, and 39 and 40 respectively, which are welded at one end to the ring clamps, and at the other end to the angle iron 17.

It will be understood that the innermost ends of the flotation elements 19 and 20 will be similarly affixed to the deck portion of the finger module by a pair of ring clamps, one of which is shown in FIG. 4. These last mentioned ring clamps will be welded together and welded to the angle iron member 16 in the same manner. They will also be provided with brace members equivalent to the braces 37 through 40 in FIG. 8.

The finger module thus far described is supported by flotation elements at both ends, but it will be noted that there is no support between the angle iron brace 14 and the angle iron brace 16. While the finger module is subjected to twisting forces throughout its length, the tendency to twist will be greatest between braces 14 and 16.

It has been discovered that this twisting may be obviated without the necessity of providing heavy and complex brace work beneath the deck portion of the finger module by simply supplying a torsion bar means. As shown in FIGS. 3, 4 and 6 through 8, a torsion bar 42 is permanently affixed as by welding or the like to the braces 14, 15 and 16. The torsion bar 42 may be made of any suitable material, including bar stock or the like. In practice, it has been found that ordinary pipe of suitable diameter serves as an adequate form of low cost torsion bar means.

The structure thus far described has been found to be substantially free of any undesirable twisting characteristics even when it is subjected to uneven loading. In effect, the finger module 8 is provided with torsion preventing means throughout its length. Not only does the pipe 42 serve as a torsion bar, but also the flotation elements 19, 20 and 21 affixed to the deck structure as described, serve as torsion preventing means for that portion of the deck to which they are affixed. It will be understood that as used herein and in the claims "torsion preventing means" relates to the means described which restrict the longitudinal twisting of the dock structures to within reasonable limits.

The free end of the finger module 8 may have its deck structure finished by the application of a channel member thereto. This is indicated in FIG. 3 at 43. The other end of the finger module is affixed to the header dock module 18 by hinge means. The use of hinge means to join header dock modules to each other and finger modules to the header docks is preferred so that the entire dock structure may accommodate the undulations of the water medium supporting it without being subjected to undue stresses. Any suitable form of hinge means may be utilized. Exemplary forms are illustrated in FIGS. 9 and 9a.

FIG. 9 illustrates a channel member 44 having a plurality of tube members 45 permanently affixed thereto by any suitable means such as welding or the like. As indicated in FIG. 3, the channel member 44 is affixed to the end of the finger module 8. At the point where the finger module is joined to the header dock module, the header dock module is provided with a similar channel member 46 having tube segments 47 permanently affixed thereto. It will be noted that the tube elements 47 are spaced on the channel member 46 in such a way as to interdigitate with the tube segments 45 on the channel member 44. When the tube segments 45 and 47 are in axial alignment, a hinge pin (not shown) may be inserted through them to effect the hinged joinder.

Figure 9A:
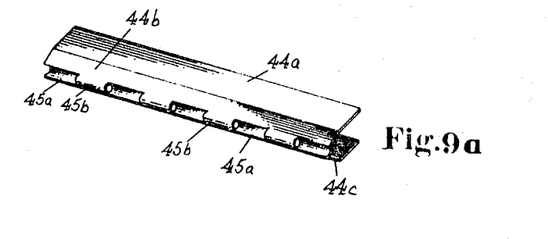
FIG. 9a is a perspective veiw of another form of hinge member.

FIG. 9a shows another form of hinge means. In this instance, however, the hinge is an integral structure made from a channel member 44a. The web of the channel member slopes outwardly as at 44b and 44c. The sloping parts of the channel web meet in a row of alternate concave and convex portions 45a and 45b respectively adapted to receive a hinge pin (not shown). In fabrication the web of the channel member may be provided with slits at the points where adjacent concave and convex portions 45a and 45b meet, and the portions 45a and 45b may then be formed by a suitable die means.

The amount of flotation used with a given finger module will depend upon the circumstances of its use and the load it is intended to sustain. The finger module 8 of FIGS. 3 and 4 has two flotation elements at its free end and only one flotation element at that end which is joined to a header dock. The reason for this is that the joined end of the finger module will be supported in large measure by the flotation elements of the header dock itself. In some instances the finger module 8 might be provided with flotation elements 19 and 20 only, and would rely for support at its joined end upon the header dock flotation alone. In such an instance the torsion bar 42 would extend from the brace 16 to the brace 13. A finger module of the type shown in FIGS. 3 and 4 is preferred because it is capable of being floated into position during the assembly or disassembly procedure.

Figure 10:
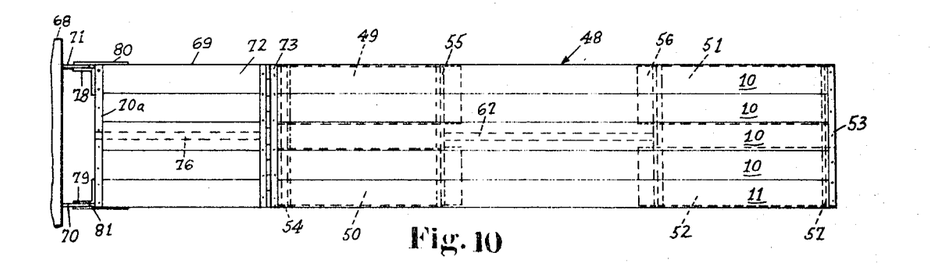
FIG. 10 is a plan view of a floating structure of the present invention connected to a shore installation by means of a bridge.
Figure 11:
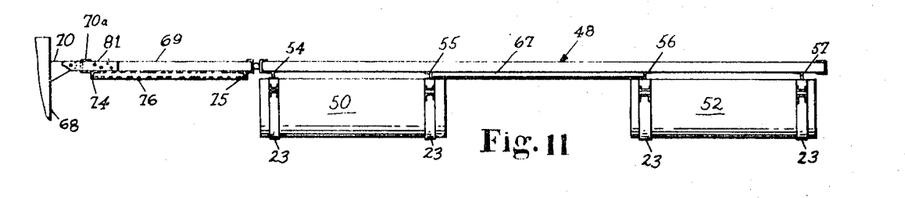
FIG. 11 is a side elevation of the structure of FIG. 10.
Figure 12:
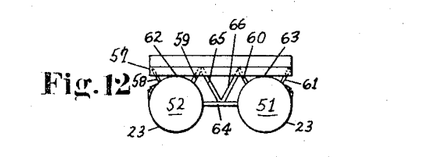
FIG. 12 is an end view as seen from the right in FIG. 11.

FIGS. 10 through 12 illustrate a modified form of finger module requiring more flotation than the finger module of FIGS. 3 and 4. As shown in FIG. 10 the finger module generally indicated at 48 is provided with two flotation elements at each end as is indicated at 49 through 52. In this instance the finger module is intended for use as a unitary dock structure in and of itself. Under such circumstances it would be desirable to make the deck structure of the finger module wider than that shown in FIGS. 3 and 4, and the structure of FIG. 10 is shown as comprising four elements 10 and one deck element 11. Again, the free end of the deck may be enclosed by a channel member 53 as described above.

The flotation elements 49 through 52 are affixed to transverse brace members 54 through 57 in the same manner as described with respect to FIG. 8. Ring clamps 23 of the type shown in FIG. 5 are used and four such ring clamps are shown in FIG. 11. FIG. 12 is an end view of the finger 48 as seen from the right in FIG. 11 and shows a typical pair of the ring clamps 23. Comparing FIG. 12 with FIG. 8, it will be noted that the ring clamps are affixed to the angle iron brace 57 in substantially the same manner, including brace means 58 through 61, similar to the brace means 37 through 40 in FIG. 8. In addition the ring clamps 23 may be welded directly to the brace 57 as at 62 and 63. In this instance, however, the width of the deck is such that the ring clamps 23 will not be in contact with each other. In such an instance an additional brace member 64 may be welded at its ends to the ring clamps 23 and additionally braced with respect to the angle iron member 57 by means of braces 65 and 66 affixed to the angle iron 57 and the brace 64.

The embodiment shown in FIGS. 10, 11 and 12 is provided with a torsion bar 67 extending between and affixed to the transverse angle iron braces 55 and 56. In this way the finger 48 is provided with torsion means throughout its length. Since the flotation means 49 through 52 are held at each end by an assembly such as that shown in FIG. 12, the flotation elements themselves will serve as torsion means for that portion of the deck which overlies them.

The finger 48 is joined to a shoreline structure 68 by means of a bridge 69. The structure 68 may be of wood, steel or concrete (as shown) and may be a seawall, an abutment or the like. The structure is provided with two outwardly extending hinge elements 70 and 71. The bridge 69 has a deck portion 72 which may be made of the same material as the deck portion of the finger 48. The adjacent ends of the finger and the bridge elements are joined by a hinge assembly, generally indicated at 73, which may be identical to the hinge assembly described with respect to FIG. 3. The ends of the bridge 72 have transversely extending brace means 74 and 75 in the form of angle irons. A torsion bar 76 extends between the braces 74 and 75 and is affixed thereto. The torsion bar 76 prevents undesired twisting of the bridge 72. That end of the bridge adjacent the concrete structure 68 may be closed with a channel member 70a to which a pair of angled hinge means 78 and 79 are affixed. The hinge means 78 and 80 on the bridge are adapted to lie on either side of the hinge means 70 of the concrete structure and all three of these elements may be provided with cooperating perforations through which a bolt or other suitable means may extend. The same is true of the hinge means 70, 79 and 81. The provision of the bridge 69 enables the finger 48 to be affixed to the concrete structure and yet accommodate changes in water level. It will be understood that the structure 68 and the bridge 69 may both be provided with hinge means of the type shown in FIGS. 9 or 9a in place of the hinges shown in FIGS. 10 and 11.

Figure 13:
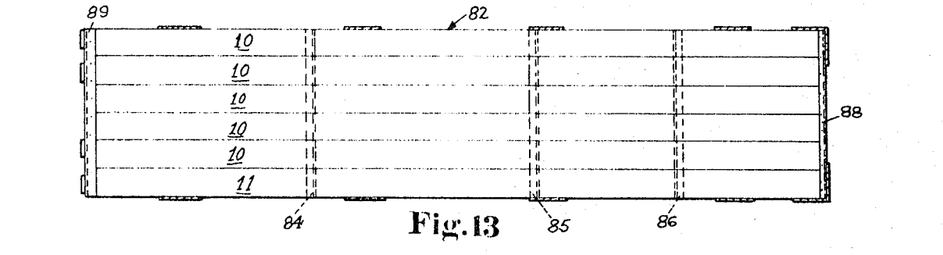
FIG. 13 is a plan view illustrating another form of finger construction.
Figure 14:
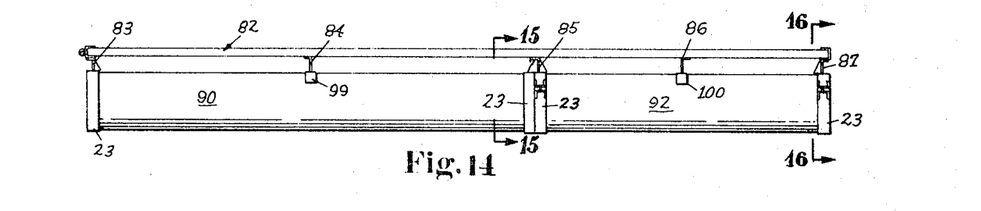
FIG. 14 is a side elevation of the structure of FIG. 13.
Figure 15:
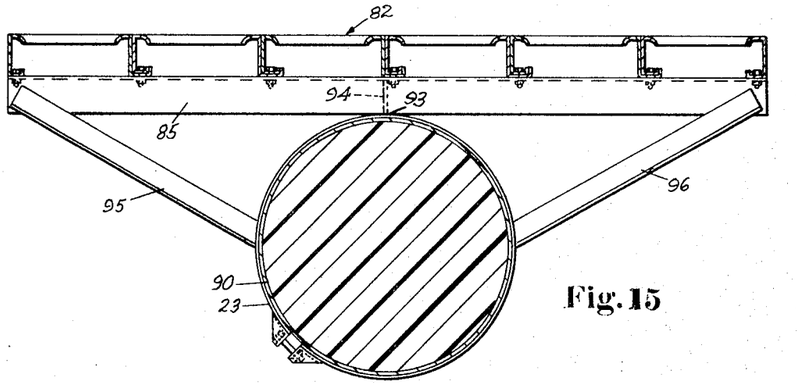
FIG. 15 is a cross sectional view taken along the section line 15—15 of FIG. 14.

FIGS. 13 through 16 illustrate an example of a finger module (generally indicated at 82) wherein the flotation means serve as torsion bars throughout the length of the finger. As shown in FIG. 13 the deck portion of the finger 82 is comprised of five elongated deck members 10 and one deck member 11. The deck members are provided on their underside with transverse braces 83 through 87 in the form of angle irons. The free end of the deck structure may be closed by means of a channel member 88 and the other end of the finger module is provided with a hinge means 89 of the type shown in FIG. 9. In this instance more than half of the finger module is supported by a single cylindrical flotation element 90 while the free end of the module is supported by two flotation elements 91 and 92. The ends of the flotation element 90 are affixed to the braces 83 and 85 by means of ring clamps 23 in an identical manner. FIG. 15 illustrates the joinder of the flotation element 90 to the brace 85. The joinder is similar to that described with respect to FIG. 6. The end of the flotation element 90 is engaged by a ring clamp 23 which is welded to the brace 85 at that point 93 where it contacts the brace. To make this joint even stronger a triangular member 94 (similar to the triangular member 31 in FIGS. 6 and 7) may be welded to both the brace 85 and the ring clamp 23. In addition braces 95 and 96 (similar to braces 28 and 29 in FIG. 6) are welded at their ends to the brace 85 and to the ring clamp 23.

Figure 16:
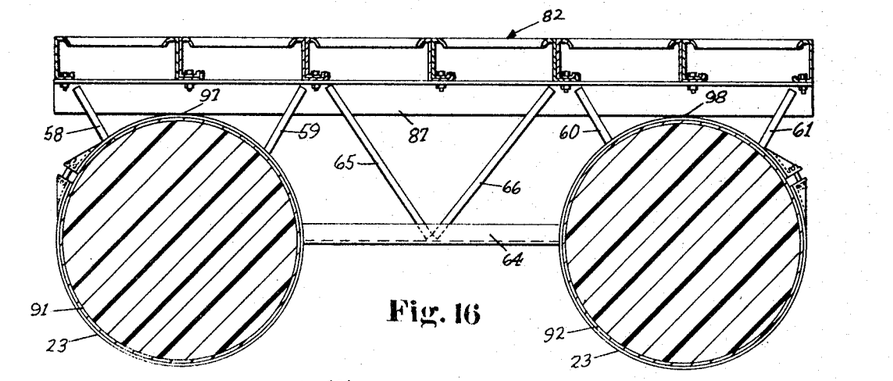
FIG. 16 is a cross sectional view taken along the section line 16—16 of FIG. 14.

The flotation elements 91 and 92 are also joined at one end to the brace 85 and at the other end to the brace 87. Their joinder to the braces 85 and 87 are identical, and FIG. 16 illustrates their joinder to the brace 87. It will be noted that FIG. 16 is similar to FIG. 12 and with respect to the braces used like parts have been given like index numerals. Again, the ring clamps 23 may be welded to the brace 87 as at 97 and 98 respectively. For most purposes the braces 58 through 61 and 65 and 66 may be made of rod stock or the like. The brace 64 which is affixed to and extends between the ring clamps 23 may be made of any suitable material but preferably is formed from angle iron or the like.

As shown in FIG. 14, there are no ring clamps in association with the transverse brace members 84 and 86. It has been found that when the ends of the flotation elements are firmly engaged by the ring clamps of the present invention, it is generally not necessary to provide additional ring clamps throughout their length. As shown in FIG. 14, it is desirable, particularly where the flotation elements are of considerable length, to provide a bearing means on each of the flotation elements for the deck structure. Two such elements in the form of arcuate means are shown at 99 and 100. They may be formed of the same material from which the ring clamps 23 are made. They are preferably affixed to the flotation elements and are welded to the braces 84 and 86 respectively. These arcuate members may be additionally braced by elements (not shown) similar to braces 58 and 59 or 60 and 61 in FIG. 16. The provision of the arcuate elements 99 and 100 enable the flotation means to provide additional support for the deck structure.

Figure 17:
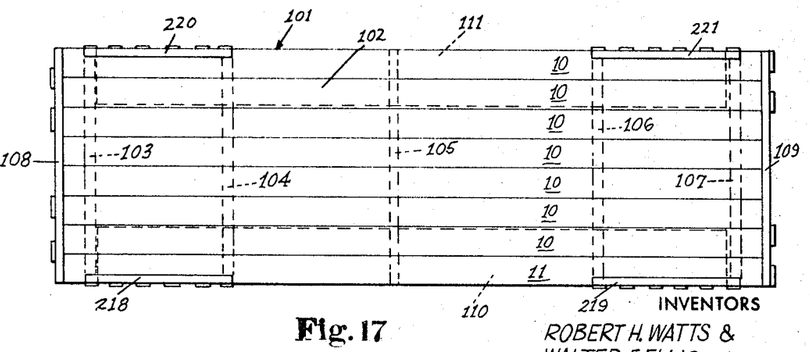
FIG. 17 is a plan view of a header dock module.
Figure 18:
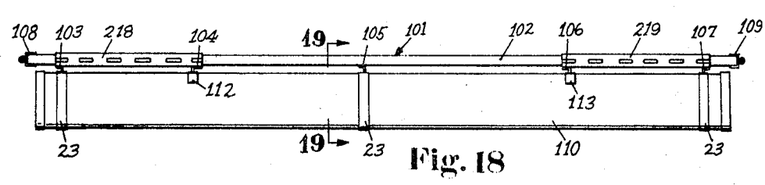
FIG. 18 is a side elevation of the structure of FIG. 17.
Figure 19:
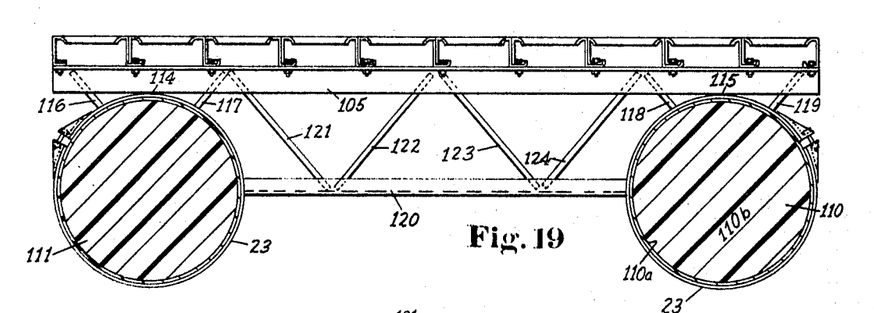
FIG. 19 is a cross sectional view taken along the section line 19—19 of FIG. 18.

FIGS. 17, 18 and 19 show one form of header dock generally indicated at 101. In construction the header dock 101 is similar to a finger module in that it is provided with a deck portion 102 having transversely extending angle iron brace members 103 through 107. Under normal circumstances the deck portion of a header dock module will be wider than the dock portion of a finger module. For purposes of an exemplary showing, the deck 102 is illustrated as made up of seven elongated interlocking members 10 and one member 11. The ends of the deck 102 are provided with hinge means 108 and 109 made in the same manner as illustrated in FIG. 9. The hinge means 108 and 109 permit attachment of the header dock 101 to other header dock modules. The last header dock module in a line may have its free end closed by means of a channel member rather than a hinge means.

The embodiment of FIGS. 17, 18 and 19 is shown as having two flotation elements 110 and 111 extending substantially the full length of the module. The flotation elements 110 and 111 may be of the type described above and are affixed to the deck portion by means of ring clamps 23 attached to the transverse angle iron braces 103, 105 and 107. At the positions of the brace members 104 and 106 both flotation means may be provided with arcuate members as described with respect to FIG. 14. Two such arcuate members are shown at 112 and 113.

FIG. 19 is a cross sectional view showing the attachment of the ring clamps 23 to the angle iron brace 105. It will be understood that the ring clamps at the braces 103 and 107 are secured in the same manner. As indicated, the ring clamps are welded to the brace 105 as at 114 and 115, and are provided with an additional bracing means 116, 117, and 118, 119 respectively.

In the particular embodiment shown, it will be noted that the flotation elements 110 and 111 are spaced apart by a considerable distance. An angle iron brace member 120 is welded at its ends to the ring clamps 23. Since the brace 120 is of considerable length, a plurality of additional braces 121 through 124 may be provided extending between it and the brace 105. The brace members 121 to 124 will prevent any bending or bowing of the element 120.

Figures 20, 21:
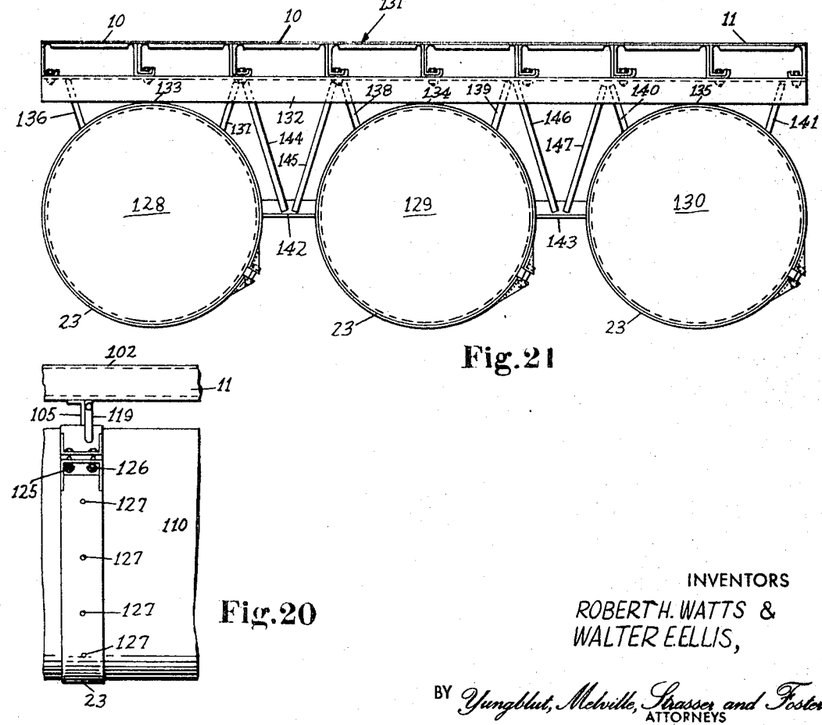
FIG. 20 is a fragmentary side elevation illustrating a ring clamp of the type used in the structure of FIGS. 17, 18 and 19.
FIG. 21 is an end elevation of a header dock structure utilizing three flotation elements.

FIG. 20 is a detailed view of a ring clamp as seen from the right in FIG. 19. It will be noted that the ring clamp is similar in construction to those shown in FIGS. 5 and 7. In this instance, however, the clamp is tightened by means of two bolts 125 and 126. In some instances where it is desired to provide some means other than the contracting force of the ring clamp itself to prevent rotation of the flotation means within the ring, the ring clamp 23 may be provided with a plurality of perforations for the receipt of screws 127 or other suitable fastening means adapted to extend radially into the flotation means. As shown in FIG. 19, the flotation means 110 comprises a cylindrical outer metallic shell 110a and a foamed plastic core 110b. With this construction the screws 127 are adapted to extend through the ring clamp 23 and engage in the metallic shell 110a of the flotation element.

In some instances and particularly where a number of modules are joined together to form a platform or the like, the individual modules may be quite wide and may be called upon to support considerable weight. In such a situation more than two flotation elements may be provided in side-by-side relationship. Again the amount of flotation will depend on the size of the module and its desired load capacity.

As an example, FIG. 21 is an end elevation of a dock module having three flotation elements 128, 129 and 130. The module of FIG. 21 is provided with a deck 131 made up of a plurality of elongated interlocking metallic elements 10 and one element 11. The figure also shows one of a number of transverse angle iron braces as at 132. The ring clamps 23 are welded to the brace 132 as at 133, 134 and 135 respectively. Each of the ring clamps is provided with a pair of additional braces 136 and 137, 138 and 139, and 140 and 141 respectively. The ring clamps are joined together by horizontally oriented angle iron members 142 and 143. These angle iron members may be additionally braced as at 144 and 145, and 146 and 147 respectively.

It will be understood that in the assemblies of FIGS. 17, 18, 19 and 21, the flotation elements extending the full length thereof will serve as torsion bar means preventing undesirable twisting of the deck portions.

Figure 22:
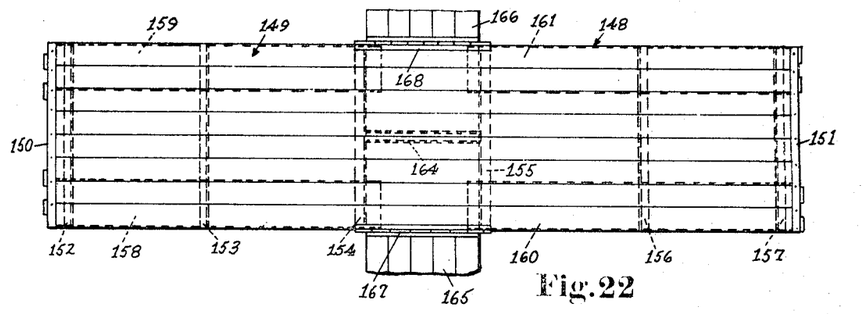
FIG. 22 is a plan view of another form of header dock module.

Another exemplary form of header dock module, generally indicated at 148, is shown in FIG. 22. The module 148 has a deck structure generally indicated at 149 which may be of the same construction as described above. The deck structure may be provided at its ends with hinge means 150 and 151 for attachment to additional modules. A plurality of transverse angle iron braces are shown at 152 through 157.

Figure 23:
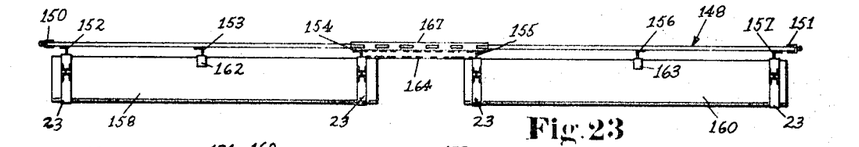
FIG. 23 is a side elevation of the structure of FIG. 22.

The embodiment of FIGS. 22 and 23 shows the use of two flotation elements at each end of the header dock module. As indicated, flotation elements 158 and 159 extend between and are affixed to transverse braces 152 and 154. Similarly, flotation elements 160 and 161 extend between and are affixed to transverse braces 155 and 157. The flotation elements are affixed to their respective transverse braces by means of ring clamps 23, as for example in the manner shown and described with respect to FIG. 19. At the positions of transverse braces 153 and 156 arcuate bearing means 162 and 163 respectively may be employed. These arcuate bearing means are the same as those shown at 99 and 100 in FIG. 14. The center portion of the module 148 is not provided with flotation. At this portion a torsion bar 164 extends between and is affixed to the transverse braces 154 and 155. In this way torsion means are provided throughout the length of the header dock module to prevent twisting. In this embodiment the torsion means comprise flotation elements 158 and 159, the torsion bar 164 and the flotation elements 160 and 161. This structure has been found effective to prevent undesirable twist even where finger modules 165 and 166 are affixed to the central portion of the header dock module by means of hinge assemblies 167 and 168 respectively. In such an assembly the torsion bar 164 in conjunction with the flotation elements has been found sufficient to prevent any twisting of the header dock module which might be caused not only by an uneven distribution of weight thereon, but also by the attachment of the finger modules 165 and 166 or any uneven distribution of weight on these fingers.

Figure 24:
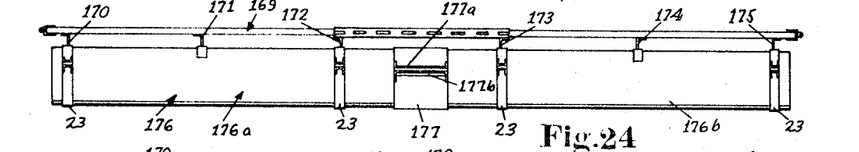
FIG. 24 is a side elevation of a header dock module showing means for joining flotation elements in end-to-end relationship.

FIG. 24 is a side elevation of a header dock module having a deck structure 169, a series of transverse angle iron braces 170 through 175 and two parallel flotation elements extending the length of the structure. One of these flotation elements is generally indicated at 176. The flotation element 176 is made up of two separate flotation means 176a and 176b in aligned, end-to-end relationship. The elements 176a and 176b are affixed respectively to angle iron braces 170 and 172, and 173 and 175. The elements 176a and 176b may be joined together by means of a connector ring 177. The connector ring is similar to the ring clamp 23 and may be made of any desirable width. The connector ring has an adjacent pair of upstanding flanges 177a and 177b provided with a plurality of coaxial bolt-receiving perforations. When the ends of the flotation elements 176a and 176b are inserted in the connector ring, the flanges 177a and 177b thereof may be drawn together by means of bolts (not shown) whereby the flotation elements 176a and 176b will be firmly engaged by the connector ring. In this way the flotation elements 176a and 176b may be made to operate as a single unit and serve as a torsion means throughout the length of the module.

Figure 25:
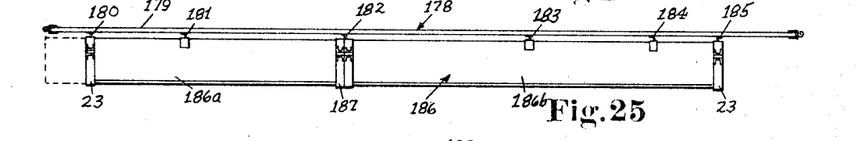
FIG. 25 is a side elevation of a header dock module showing the use of a clamping ring to join flotation elements in end-to-end relationship.

FIG. 25 illustrates another header dock module wherein two flotation elements extend substantially the full length of the module, each of the flotation elements being made up of two parts. The module, generally indicated at 178, has a deck structure 179 provided with transversely extending angle iron braces 180 through 185. A typical cross section of this structure would be similar to that shown in FIG. 19. One of the two elongated flotation elements is shown generally at 186 and is made up of two parts 186a and 186b. The outermost ends of the flotation elements 186a and 186b are affixed to the braces 180 and 185 respectively by means of ring clamps 23. Unlike the structure of FIG. 24, the abutting ends of the flotation elements 186a and 186b are located at the position of a transverse brace 182. In such an instance the abutting ends of the flotation elements 186a and 186b may be joined by a ring clamp 187. The ring clamp 187 may be made up of two ring clamps of the type shown at 23 welded together. As shown in FIG. 25, however, the ring clamp 187 is an integral unit similar in every respect to a ring clamp 23 but of approximately twice the width. Again, with this type of joinder, the flotation elements 186a and 186b will act as a unitary structure and a torsion means throughout the length of the header dock module.

Figure 26:
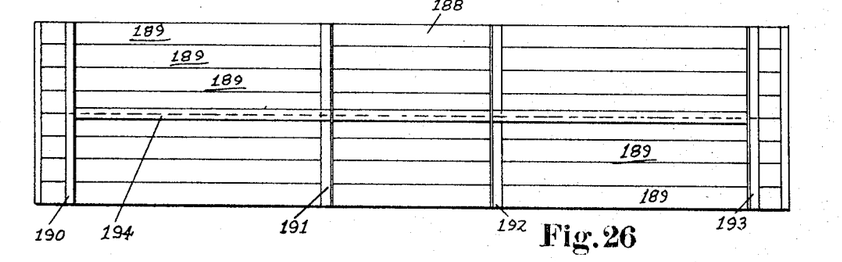
FIG. 26 is a bottom view of an exemplary form of deck structure.

The torsion means of the present invention may be applied to any elongated deck or platform structure irrespective of its intended use. When used in dock structures of the like, the torsion means of the present invention may be applied to a deck structure irrespective of the type of flotation utilized. In FIG. 26 a bottom view of a deck structure is generally indicated at 188. For purposes of illustration the deck 188 is illustrated as made up of a plurality of elongated planks 189 in side-to-side relationship. These planks may be of wood, metal, or other suitable material and are joined together by a plurality of transverse braces 190 through 193. This deck structure may be made to resist undesirable twisting simply by the application of a torsion bar member 194 extending throughout its length and affixed to the brace members 190 through 193. The torsion bar 194 may be made up of separate elements extending between and affixed to each of the braces 190 through 193, or it may be a unitary structure affixed to each brace as shown in FIG. 26. As indicated above, the material from which the torsion bar 194 is fabricated does not constitute a limitation on the present invention except that it must be of sufficient strength to resist torsional stresses. As indicated above ordinary pipe of suitable diameter has been found to be inexpensive and effective.

Figure 27:
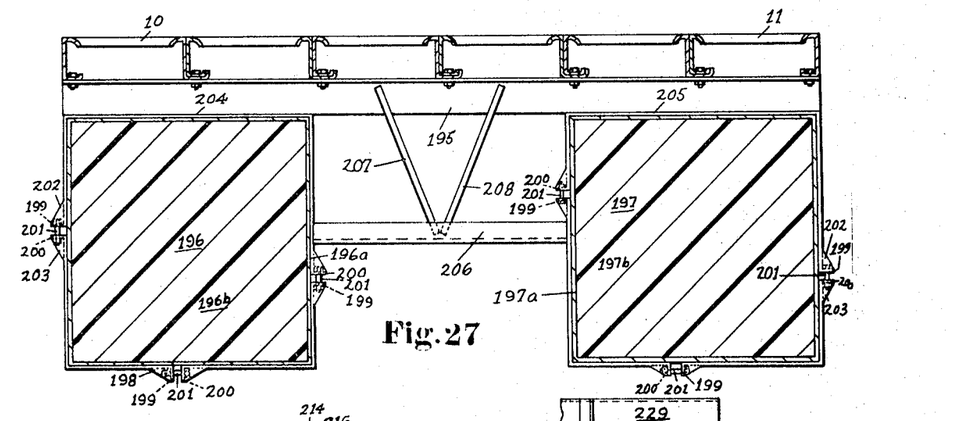
FIG. 27 is an end view of a floating structure of the present invention utilizing flotation elements of rectangular cross section.

FIG. 27 illustrates that the clamping and bracing arrangement of the present invention, whereby flotation elements are affixed to a deck structure, are not limited to the use of flotation elements having a circular cross section. In some instances it may be desirable not to use clamping means for affixing the flotation elements to the dock portion. When this is the case, the flotation means may be affixed to the dock structure in any suitable manner, and the dock structure may be prevented from twisting by the use of a torsion bar extending its full length, as shown in FIG. 26. The advantage of the clamping and bracing means of the present invention is that it enables the flotation means themselves to serve as torsion bar means.

In FIG. 27 a deck structure is shown comprising a plurality of elongated interlocking elements 10 and one element 11. These elements are provided with a plurality of transversely extending brace members one of which is shown at 195. In this embodiment flotation means 196 and 197 have a square cross section. The flotation element 196 comprises a hollow metallic member 196a filled with foamed plastic 196b. The flotation element 197 is of the same construction comprising the hollow body 197a which may be sealed or filled with foamed plastic 197b.

The flotation element 196 is engaged by a strap-like clamping means 198 having a rectangular configuration. In most other respects the clamp 198 is similar to the ring clamp 23 of FIG. 5. The clamp 198 is provided with three identical joints 198a, 198b and 198c. These joints have outturned flanges 199 and 200, and these flanges have coaxial perforations for the receipt of one or more fastening bolts 201. Flanges 199 and 200 may be additionally braced with triangular members 202 and 203 respectively, similar to the triangular members 25a and 26a in FIG. 6. The flotation element 197 is engaged by an identical clamp which has been given like index numerals. The upper horizontal surfaces of the clamps 198 are affixed to the angle iron brace 195 in any suitable manner. For example, they may be welded throughout their length to the brace 195 as at 204 and 205 respectively. As in the case of the ring clamps described above, the clamps of FIG. 27 are joined together by a connecting brace 206. Additional brace work may be provided as at 207 and 208 to prevent distortion of the brace element 206.

Figures 28, 31, 32:
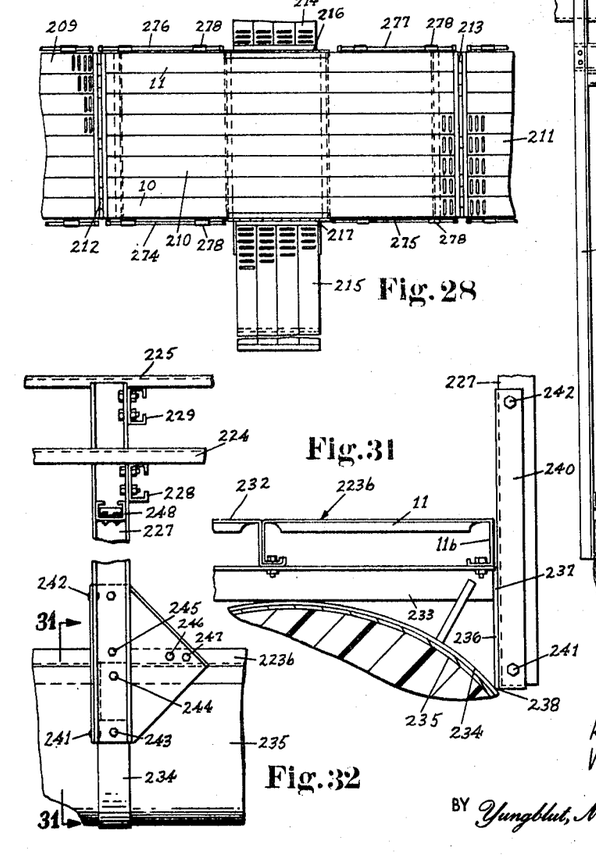
FIG. 28 is a fragmentary plan view illustrating an exemplary assembly of header dock and finger modules.
FIG. 31 is a fragmentary cross sectional view taken along the section line 31—31 of FIG. 32.
FIG. 32 is a side elevation of a finger member illustrating a roof support thereon.

FIG. 28 is a fragmentary plan view showing a typical assembly of header dock and finger dock modules. Header dock modules 209, 210 and 211 are joined in endwise relationship by hinge means 212 and 213 respectively. Finger modules may extend laterally from each header dock module. Two such finger modules are shown at 214 and 215 affixed to the header dock module 210 by hinge means 216 and 217 respectively.

It will be understood by one skilled in the art that depending on its size and length, a given header dock module may have more than one laterally extending finger dock on each side. For example, the header dock module in FIG. 17 shows hinge means 218 and 219 on one side, and hinge means 220 and 221 on the other, whereby two finger docks will extend laterally from each side of the header dock module.

In a header dock module having one or more laterally extending fingers it has been found desirable to arrange the transverse deck braces in such a way that they are located at and connected to the hinge means on the header dock to which the fingers are attached. Thus, in FIG. 17 hinges 218 and 220 are joined by braces 103 and 104 and hinges 219 and 221 are joined by braces 106 and 107. In FIG. 22 hinges 167 and 168 are joined by braces 154 and 155. The arrangement is also shown in FIG. 28. The connection of these hinge means by adjacent transverse deck braces substantially strengthens the dock structure and enables the fingers to sustain lateral blows from water craft or the like without injury to the modules or the hinge means.

Figure 29:
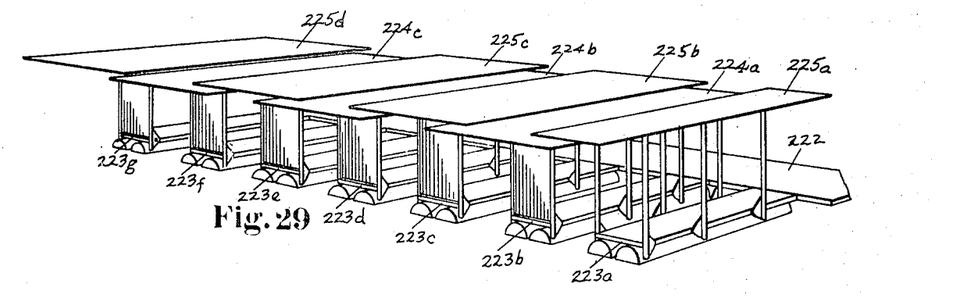
FIG. 29 is a perspective view of a floating structure of the present invention provided with roof means.

It is within the scope of the present invention to provide a dock structure made up of finger dock and header dock modules provided with a roof structure. This is illustrated in FIGS. 29 through 33. FIG. 29 is a fragmentary perspective view of a dock assembly similar to that shown in FIG. 2. For purposes of clarity, the finger modules on one side of the header dock assembly have been eliminated. The header dock assembly 222 has extending laterally from it a plurality of finger modules some of which are shown at 223a through 223g. Each of the finger modules has a plurality of uprights which support horizontally oriented roof members. As is most clearly shown in FIGS. 29 and 33 alternate spaces between the finger modules are covered by roof elements 224a through 224c. The remaining spaces between fingers is covered by roof elements 225a through 225d. It will be noted that the roof elements 224a through 224c lie in the same plane, while the roof elements 225a through 225d lie in a plane parallel to and above the roof elements 224a through 224c. This staggered arrangement of the roof elements 224 and 225 allows heat to escape from below the roof structure and permits movement or flexure of the entire dock structure.

Figure 33:
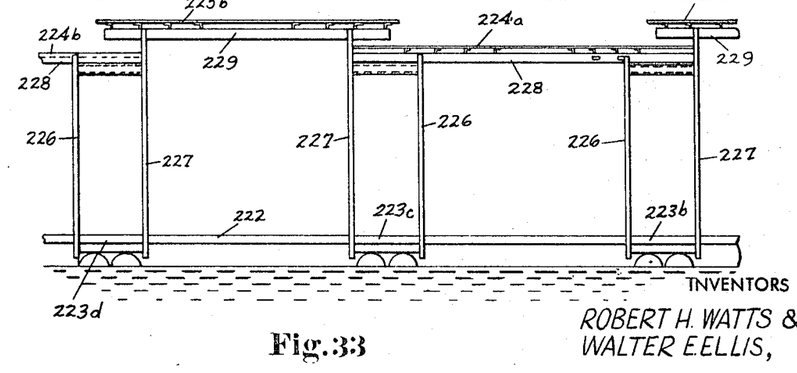
FIG. 33 is a side elevation of a floating dock structure of the present invention showing the overlapping roof structure.

As will be most clearly seen in FIG. 33, each finger element is provided with short uprights 226 along one of its sides and long uprights 227 along the other side. The uprights 226 and 227 are so arranged on the fingers that with respect to adjacent fingers the sides thereof which face each other will bear the same type of uprights. As will be noted, the space between fingers 223b and 223c is covered by the lower roof element 224a. The roof element is supported by a plurality of beams which in turn are supported by the uprights on the fingers 223b and 223c. One such beam is shown at 228 and is affixed to the uprights 226 and has its ends attached to the uprights 227.

The space between the fingers 223c and 223b is covered by the upper roof member 225b which in turn is supported by a plurality of horizontal beams (one of which is shown at 229) affixed to the uprights 227 on the last mentioned fingers. The roof structure is continued in this way throughout the length of the dock structure. It will be noted that the upper roof members overlap the lower roof members by a considerable distance. As is shown in FIG. 29 both the upper and lower roof members extend beyond the free ends of the finger modules. At the ends of the finger modules which are attached to the header dock assembly, the upper and lower roof elements overlap the header dock assembly by a distance slightly less than half the width of the header dock assembly. This is indicated in dotted lines in FIG. 2. It will be noted that the two roof structures shown in dotted lines and indicated at 230 and 231 overlap the header dock assembly but do not contact each other. In this way roof structures supported by the finger docks do not interfere with the capability of flexure which characterizes the entire dock structure by virtue of the fact that all of the finger and header dock modules are joined together by hinge means.

Figure 30:
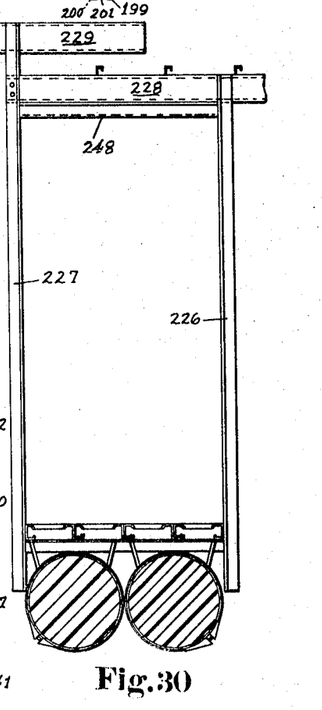
FIG. 30 is an end elevation of a finger structure illustrating a portion of the roof structure supported thereby.

FIGS. 30, 31 and 32 show in detail the manner in which the uprights 226 and 227 are affixed to a finger module. In FIGS. 31 and 32 a finger module 223b is shown as having a deck structure generally indicated at 232. One of the transversely extending deck braces is illustrated at 233, and a ring clamp and flotation element are shown respectively at 234 and 235. A vertically oriented plate 236 is welded to the end of the deck brace 233 as at 237 and to the ring clamp as at 238. An upright 227 is provided at its lower end with a plate 239. The plate 239 has an outstanding flange 240 which extends about the edge of the upright 227. The plate 239 may be affixed to the upright 227 by means of bolts as at 241, 242 and 243. The assembly comprising the upright 227 and the plate 239 is affixed to the finger dock by bolts 243 and 244 which pass through the upright, the plate 239 and the plate 236. In addition a bolt 245 may be provided which passes through the upright, the plate 239 and the downwardly depending side 11c of the deck member 11. Similarly, bolts 246 and 247 may be provided which pass through the plate 239 and the side 11c of the deck member.

As is shown in FIGS. 30 and 32, the upper portions of the uprights 226 and 227 may be joined together by a horizontally oriented beam 248. FIG. 32 also shows the attachment of the beam 228 supporting the roof element 224 and the beam 229 supporting the roof element 225 to the upper end of the upright 227. It will be understood by one skilled in the art that all of the uprights 226 and 227 may be affixed to their respective finger modules in the manner described in connection with FIGS. 31 and 32.

The floating dock structure of the present invention may be anchored in place by any suitable means. An exemplary form of anchoring is shown in FIG. 2. In that figure selected ones of the header dock modules are provided with winch assemblies generally indicated at 249, 250 and 251. The winch assembly 249, nearest the shore, is joined by means of cables 249a and 249b to anchoring means generally indicated at 249c and 249d respectively. The on-shore anchoring means 249c and 249d may be of any suitable type including "dead men" or the like. The winch means 250, located substantially in the center of the header dock assembly, is attached by means of laterally extending cables 250a and 250d. Similarly, the winch means 251 is joined by means of cables 251a and 251b to anchoring means 251c and 251d which are located forward of the dock structure. It will be noted from FIG. 2 that the winch, cable and anchor assemblies are so arranged that the dock structure is not only firmly anchored, but also may be shifted up and down as well as toward and away from the shore to accommodate changes in water level and changes in season.

Figure 34:
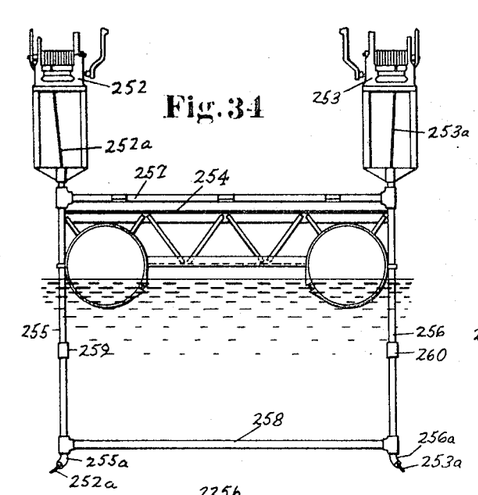
FIG. 34 is an end elevation of a header dock module illustrating the application of winch mounts and substructure thereto.
Figure 35:
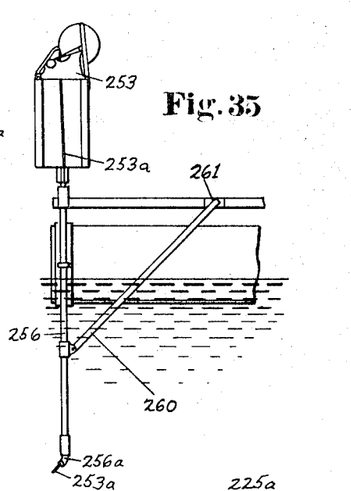
FIG. 35 is a fragmentary side elevation of the structure of FIG. 34.

A typical winch assembly is illustrated in FIGS. 34 and 35. Winches 252 and 253 are mounted on either side of a header dock module generally indicated at 254. The winches are mounted on vertically oriented pipe means 255 and 256. These pipe means are joined together by a horizontally oriented pipe 257 extending along the upper deck surface of the header dock and affixed to the deck. The lowermost ends of the vertical pipes 255 and 256 are similarly joined near their bottom ends (beneath the water) by a second horizontally oriented pipe 258. The vertical pipes 255 and 256 may be additionally braced by pipe or brace means 259 and 260 affixed to the vertical pipes below the water level and extending upwardly and away from them. As shown in FIG. 35, the brace 260 is affixed to the deck structure as at 261. The cables 252a and 253a which are controlled by the winches 252 and 253 extend downwardly through the vertical pipes 255 and 256 respectively. The cables exit from the lowermost ends of these pipes and extend to the anchoring means. In this way it is insured that the cables will not foul the dock structure itself or water craft using it. As shown at 255a and 256a, the lowermost ends of the vertical pipes may be turned outwardly to prevent undue wear of the cables at the point where they depart from the vertical pipes.

The exemplary winch structure shown in FIGS. 34 and 35 are illustrated as positioned at the end of the last header dock module of a header dock assembly. It will be understood by one skilled in the art that when such a winch assembly is located elsewhere on the header dock assembly, the pipe 257 may be located beneath the deck structure of the header dock module and affixed thereto. Also, in such an instance additional braces (similar to the braces 259 and 260 but extending in the opposite direction) may be employed. It will be further understood that channel members may be used instead of the pipes 255 and 256 with the cables 252a and 253a running through the channel members.

Figure 36:
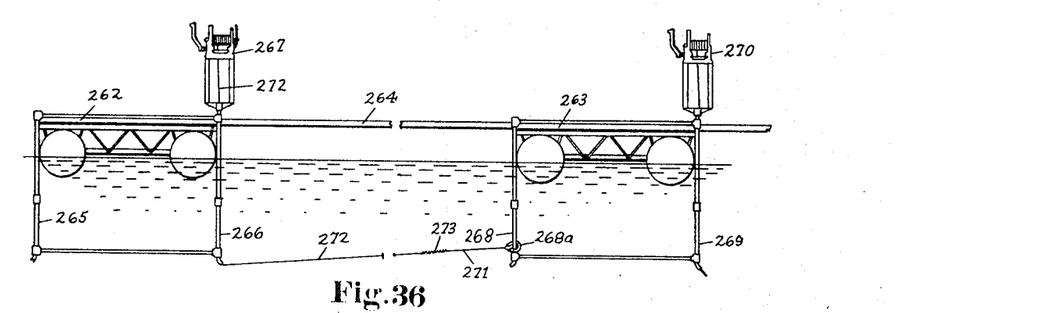
FIG. 36 is a fragmentary elevational view of a dock structure showing a method whereby header dock modules may be joined together beneath the water by cable means.

FIG. 36 shows a dock installation wherein a number of header docks (two of which are shown at 262 and 263) extend laterally from a shoreline structure 264. While they have been eliminated from the drawings for purposes of clarity, it will be understood that each header dock may have a plurality of laterally extending finger modules. The header docks 262 and 263 are provided with winch means of the type described in FIGS. 34 and 35. The winch means on header dock 262 includes the two vertical pipes as at 265 and 266 and at least one winch 267 supported by the pipe 266. Similarly the winch means on header dock 263 includes vertical pipes 268 and 269 and a winch means 270.

The arrangement shown in FIG. 36 illustrates how a series of substantially parallel header dock assemblies may be joined together by cable means. The vertical pipe 268 on header dock 263 has affixed thereto by any suitable means, such as a pipe return 268a, a cable section 271. The winch 267 on header dock 262 controls a cable 272. Cables 271 and 272 are joined together by a splice means 273. The splice means 273 may be of any suitable type capable of being connected and disconnected at will. The vertical pipes 265 and 269 must be anchored in some way. They may be connected to adjacent header dock assemblies in the manner described, or they may be connected to anchoring means.

When an installation of the type shown in FIG. 36 is required to be removed and stored during certain seasons of the year, this may be accomplished in the following manner. By means of winch 267 cable 272 may be let out and allowed to become slack. Suitable grappling means may be used from the deck of header dock 263 to pull up the splice 273 and disconnect it. Cable 272 may then be reeled in by means of winch 267 and cable 271 may be made secure on header dock 263. When the header docks are reinstalled, an excess amount of cable 272 may be let out by winch 267; connected to cable 271 at splice means 273; and then tightened by winch 267.

During the docking procedure it is not uncommon that the bow of a boat might contact the downwardly depending edges of a deck member 10 or 11 on the side of a header dock module. The upwardly sloping bow of a boat could be damaged by contact with such a vertical edge. To avoid this it is within the scope of the invention to provide the edges of header dock modules with longitudinally extending pipes serving as bumpers and presenting a rounded contact surface. This is shown in FIG. 28 wherein pipe means 274 and 275 are affixed to the edge of deck member 10, and pipe means 276 and 277 are affixed to the edge of deck member 11. These pipe means may be affixed in any suitable manner as by straps 278.

With respect to the finger modules there is a somewhat related problem. Water craft are moored parallel to the finger docks and care must be taken to prevent edge portions of the deck of a boat from hooking over or under the edge portions of the finger module. Exemplary means for overcoming this problem are illustrated in association with finger module 8 in FIGS. 3, 6 and 8. The edge portions of a finger module 8 are provided with vertically oriented pipes 279 through 284 which extend above and below the deck structure 9 and serve as bumpers. Pipes 279 and 282 are shown in FIG. 6 as affixed to the transverse brace 14 by means of sleeves or pipe joints 285 and 286 respectively. The sleeves or pipe joints 285 and 286 are permanently affixed to the ends of the brace 14 as by welding or the like. The pipes 280 and 283 are similarly joined to the transverse brace 16 by means of joints or sleeves 278 and 288. In this instance the pipes may be additionally secured to the ring clamps 23 by means of sleeves, straps or the like shown at 289 and 290. The pipes 279 through 284 may have their ends capped as shown.

In the dock structure of the present invention the length and width of the header dock and finger modules will be governed by the size of the installation desired. Any form of flotation may be used, and any arrangement of it may be made as well. When the flotation means are affixed to the deck portions of the modules by the clamp and bracing means of the present invention, the flotation elements themselves may be employed as torsion bars. The modular aspects of the structure of the present invention have a number of salient advantages. The parts making up the various modules may be standardized whereby repair or replacement of individual parts may be easily accomplished. The header dock and finger dock modules may be made in a series of standardized sizes and joined together to make dock structures of different effective sizes and capabilities. The finger and header dock modules can be assembled in the manufacturer's plant and handled and shipped as package units.

Modifications may be made in the invention without departing from the spirit of it.

The embodiments of the invention in which an exclusive property or privilege is claimed are defined as follows:

1. The combination comprising an elongated planar platform structure twistable about a lengthwise axis thereof, a plurality of braces affixed to said platform structure, said braces extending transversely of said platform structure and in spaced relation to each other, torsion bar means extending substantially the length of said platform structure and interconnecting transverse braces so that the respective portion of said torsion bar means affixed to each brace is relative to said respective brace rotatively immovable about an axis extending lengthwise of said platform, said torsion bar means cooperating with said braces to prevent substantial twisting of said platform structure about said lengthwise axis.

2. A dock module comprising an elongated planar deck structure twistable about a lengthwise axis, a plurality of braces affixed to said deck structure, said braces extending transversely of said deck structures and being spaced therealong, flotation means supporting said deck structure, said flotation means comprising an elongated torsion bar member with its long axis extending lengthwise of said deck structure, and means nonrotatively attaching said flotation means to a first and a second one of said transverse braces, said flotation means acting to prevent substantial twisting of said deck structure about its lengthwise axis between said first and second transverse braces.

3. The structure claimed in claim 1 wherein said torsion bar means comprises an elongated hollow pipe.

4. The structure claimed in claim 1 wherein the planar platform structure comprises a plurality of platform sections connected in lengthwise alignment and said torsion bar means comprises a plurality of portions extending parallel to the lengthwise axis of said platform and each said platform section having one respective portion of said torsion bar means interconnecting transverse braces adjacent the ends of said platform section.

5. The structure claimed in claim 2 including a shoreline structure, a bridge joining said dock module and said shoreline structure, said bridge comprising an elongated planar deck structure, a plurality of braces affixed to said bridge deck structure, said last mentioned braces extending transversely of said bridge deck structure and at right angles to the long axis thereof, torsion bar means affixed to said last mentioned transverse braces and extending substantially the length of said bridge deck structure, said last mentioned torsion bar means acting to prevent twisting of said bridge deck structure about its long axis, first hinge means joining said bridge to said shoreline structure, and second hinge means joining said bridge and said dock module.

6. The structure claimed in claim 2 wherein said flotation means comprises at least one elongated member with its long axis parallel to the long axis of said deck structure, means for non-rotatively attaching said flotation means to those of said transverse braces nearest the ends of said flotation means, said attaching means comprising band-like clamps non-rotatively affixed to said last mentioned braces and engaging about the periphery of said flotation means, each of said clamps having at least one joint therein, means for tightening said joint and contracting said clamp about said flotation means, said flotation means comprising a part at least of said torsion bar means and acting to prevent the twisting about its long axis of that portion of said deck structure extending between said last mentioned ones of said transverse braces.

7. The structure claimed in claim 2 wherein said flotation means comprises at least two elongated members of substantially equal length and with their long axis parallel to said long axis of said deck structure, means for nonrotatively attaching said flotation means to a first and a second one of said transverse braces, said first and second transverse braces being located nearest the ends of said flotation means, said attaching means comprising band-like clamps non-rotatively affixed to said first and second ones of said braces, the number of clamps on each of said last mentioned braces being equal to the number of flotation means, each clamp engaging about the periphery of its respective flotation means, each of said clamps having at least one joint therein, means for tightening said joint and contracting said clamp about its respective flotation means, means for joining said clamps on each of said first and second ones of said braces to each other, said flotation means serving as torsion bar means and acting to prevent the twisting about its long axis of that portion of said deck structure extending between said first and second ones of said braces.

8. The structure claimed in claim 7 wherein said flotation means are in side-by-side relationship, said clamps on each of said first and second ones of said transverse braces being affixed directly to each other.

9. The structure claimed in claim 7 wherein said flotation means are in parallel spaced relationship, said means for joining said clamps on each of said first and second ones of said transverse braces comprising brace members extending therebetween and affixed thereto.

10. The structure claimed in claim 7 wherein said first and second ones of said braces are positioned near the ends of said deck structure, said flotation means extending substantially the length of said deck structure.

11. A dock module comprising an elongated planar deck structure, a plurality of braces affixed to said deck structure, said braces extending transversely of said deck structure, torsion preventing flotation means comprising at least two elongated members of substantially equal length and with their long axes parallel to the long axis of said deck structure and supporting said deck structure, means for non-rotatively attaching said torsion preventing flotation means to a first and a second one of said transverse braces, said first and second transverse braces being located nearest the ends of said flotation means, said first one of said transverse braces being located near one end of said deck structure, said second one of said transverse braces being located short of the other end of said deck structure, said attaching means comprising band-like clamps non-rotatively affixed to said first and second ones of said braces, the number of clamps on each of said last mentioned braces being equal to the number of flotation means, each clamp engaging about the periphery of its respective flotation means, each of said clamps having at least one joint therein, means for tightening said joint and contracting said clamp about its respective flotation means, means for joining said clamps on each of said first and second ones of said braces to each other, said flotation means serving as torsion preventing means and acting to prevent the twisting about its long axis of that portion of said deck structure extending between said first and second ones of said braces, a third one of said transverse braces being located near said other end of said deck structure, and torsion preventing means extending between and affixed to said second and third ones of said transverse braces, said torsion preventing means acting to prevent twisting of said deck structure about its long axis.

12. A dock module comprising an elongated planar deck structure, a plurality of braces affixed to said deck structure, said braces extending transversely of said deck structure, torsion preventing flotation means comprising at least two elongated members of substantially equal length and with their long axes parallel to the long axis of said deck structure and supporting said deck structure, means for non-rotatively attaching said torsion preventing flotation means to a first and a second one of said transverse braces, said first and second transverse braces being located nearest the ends of said flotation means, said first one of said transverse braces being located near one end of said deck structure, said second one of said transverse braces being located short of the other end of said deck structure, said attaching means comprising band-like clamps non-rotatively affixed to said first and second ones of said braces, the number of clamps on each of said last mentioned braces being equal to the number of flotation means, each clamp engaging about the periphery of its respective flotation means, each of said clamps having at least one joint therein, means for tightening said joint and contracting said clamp about its respective flotation means, means for joining said clamps on each of said first and second ones of said braces to each other, said flotation means serving as torsion preventing means and acting to prevent the twisting about its long axis of that portion of said deck structure extending between said first and second ones of said braces, a third one of said transverse braces being located near said other end of said deck structure, a fourth one of said transverse braces being located between said second and third braces, at least two elongated flotation means affixed near their ends to said third and said fourth ones of said transverse braces by means of additional ones of said clamps, means for joining said clamps on each of said third and fourth ones of said transverse braces to each other, said last mentioned flotation means serving as torsion preventing means and acting to prevent the twisting of that portion of said deck structure extending between said third and said fourth ones of said transverse braces, and torsion bar means extending between and affixed to said second and said fourth ones of said transverse braces, said torsion bar means acting to prevent the twisting of that portion of said deck structure extending between said last mentioned transverse braces and said torsion preventing means acting to prevent twisting of said deck structure about its long axis.

13. The structure claimed in claim 11 wherein said torsion preventing means extending between and affixed to said second and third ones of said transverse braces comprises a torsion bar means.

14. The structure claimed in claim 11 wherein said torsion preventing means extending between and affixed to said second and third ones of said transverse braces comprises at least one elongated flotation means, additional ones of said clamps affixing said last mentioned flotation means near its ends to said last mentioned transverse braces.

15. A dock structure comprising a plurality of header dock modules and finger dock modules, said header dock and finger dock modules each comprising an elongated planar deck structure, a plurality of braces affixed to said deck structure, said braces extending transversely of said deck structure, flotation means supporting said deck structure, torsion bar means affixed to said transverse braces and extending substantially the length of said deck structure, said torsion bar means acting to prevent twisting of said deck structure about its long axis, means for joining said header dock modules in end-to-end relationship to form a flexible header dock assembly, said last mentioned means comprising first hinge means in association with the adjacent ends of said header dock modules, a plurality of finger dock modules extending laterally from at least one side of said header dock assembly in parallel spaced relationship, second hinge means in association with the ends of said finger modules and the sides of adjacent ones of said header dock modules joining said finger modules to said header dock assembly.

16. The structure claimed in claim 15 wherein said first and second hinge means comprise channel members affixed to said modules being joined, said channel members having tube-like elements affixed thereto in aligned coaxial relationship, said tube-like elements being so placed on their respective channel members that when said channel members are adjacent each other, said tube-like elements thereon lie in interdigitating coaxial relationship, and hinge pin means extending through said interdigitated tube-like elements.

17. The structure claimed in claim 15 wherein said first and said second hinge means comprise channel members affixed to said modules being joined, said channel members having facing surfaces, said facing surfaces having integral and alternate concave and convex portions, said concave and convex portions being arranged on said facing surfaces so that when said channel members are adjacent each other the alternate concave and convex portions lie in aligned interdigitating relationship, said convex portions being hollow and open at their ends, and hinge pin means extending through said aligned convex portions.

18. The structure claimed in claim 15 including a roof, said roof comprising a plurality of first and second roof panels, brace means in association with said finger modules for supporting said first and second roof panels, said first roof panels lying in a first substantially horizontal plane and spanning alternate ones of said spaces between said finger modules and a portion of the adjacent finger modules, said second roof panels lying in a second substantially horizontal plane above said first plane and spanning the remaining ones of said spaces between said finger modules, said second roof panels overlapping said first roof panels.

19. The structure claimed in claim 15 including vertically oriented pipe means affixed to the ends of said transverse braces of said finger modules, said pipe means extending above and below said finger module deck structures and acting as bumper means.

20. The structure claimed in claim 15 including horizontally oriented pipe means affixed to the side edges of said deck structures of said header dock modules, said horizontal pipe means acting as bumper means.

21. The structure claimed in claim 15 including winch means for anchoring cables on selected ones of said header dock modules, each of said winch means comprising a pair of vertically oriented, open ended hollow pipes, means for affixing said pipes to said header dock module, said pipes positioned in parallel spaced relationship on opposite sides of said header dock module, the upper ends of said pipes extending above said deck structure of said header dock module, the lower ends of said pipes extending below said flotation means, a cable carrying winch supported on said upper end of each of said pipes, said cables extending downwardly from said winch, through said pipes and outwardly from the bottom ends thereof.

22. The structure claimed in claim 15 wherein a first group of said finger dock modules extend laterally in parallel spaced relationship from one side of said header dock assembly, a second group of said finger dock modules extending laterally in parallel spaced relationship from the other side of said header dock assembly, the finger modules of said second group lying opposite the finger modules of said first group, a roof structure supported by each of said groups of finger modules, each of said roof structures comprising a plurality of first and second roof panels, brace means in association with each of said groups of finger modules for supporting said first and second roof panels of said roof structures, said first roof panels of each of said roof structures lying in a first substantially horizontal plane and spanning alternate ones of said spaces between said finger modules and a portion of the adjacent finger modules of their respective groups, said second roof panels of each of said roof structures lying in a second substantially horizontal plane above said first plane and spanning the remaining ones of said spaces between said finger modules of their respective groups, said second roof panels of each roof structure overlapping said first roof panels of the same roof structure, said first and second roof panels of one of said roof structures being coplanar with and aligned with said first and second roof panels of said other roof structure respectively, the adjacent ends of said first and second roof panels of said roof structures overlapping said header dock assembly and lying in parallel spaced relationship from each other.

23. A dock structure comprising a shoreline structure, a plurality of header dock assemblies affixed to said shoreline structure and extending therefrom in substantially parallel spaced relationship, each of said header dock assemblies having a plurailty of finger dock modules extending laterally from at least one side thereof in parallel spaced relationship, said finger dock modules affixed to said header dock assemblies, said header dock assemblies comprising a plurality of header dock modules joined in end-to-end relationship, said header dock and finger dock modules each comprising an elongated planar deck structure, a plurality of braces affixed to said deck structure, said braces extending transversely of said deck structure, flotation means supporting said deck structure, torsion preventing means affixed to said transverse braces and extending substantially the length of said deck structure, said torsion preventing means acting to prevent twisting of said deck structure about its long axis, winch means near the end of each of said header dock assemblies, each of said winch means comprising a pair of vertically oriented hollow open ended pipes, means for affixing said pipes to a selected one of said header dock modules, said pipes positioned in parallel spaced relationship on opposite sides of said module, the upper ends of said pipes extending above said deck structure of said module, the lower ends of said pipes extending below said flotation means, a cable carrying winch supported on the upper end of at least one of said pipes, a cable extending downwardly from said winch, through said vertical pipe supporting said winch and outwardly from the bottom end of said last mentioned pipe, each of said cables of each of said selected modules provided at its end with a disconnectible splice means, each of said splice means connected to another cable which in turn is connected to the nearest one of said vertical pipes on the adjacent one of said selected modules, whereby the said header dock assemblies are joined together.

24. A dock module as in claim 2 wherein the flotation means comprises at least two elongated side-by-side members of substantially equal length and there is means for joining said side-by-side members together.

25. A dock module as in claim 2 wherein the flotation means comprises at least two elongated side-by-side members of substantially equal length, and there is a torsion bar member attached to and extending between the second of the transverse braces and a third of the transverse braces acting to prevent substantial twisting of the deck structure about the lengthwise axis between the second and third transverse braces.

26. A dock module as in claim 2 wherein the flotation means comprises at least two elongated side-by-side members of substantially equal length, there is a torsion bar member attached to and extending between the second of the transverse braces and a third of the transverse braces acting to prevent substantial twisting of the deck structure bewneen the second and third transverse braces, and there is further flotation means between the third transverse brace and a fourth of the transverse braces, the further flotation torsion bar means being non-rotatively attached to the third and fourth transverse braces to prevent twisting of the deck structure between the third and fourth transverse braces.

References Cited
UNITED STATES PATENTS

| | | | |
|---|---|---|---|
| 1,652,703 | 12/1927 | Cushman | 61—15 X |
| 1,723,213 | 8/1929 | Smith | 114—.5 X |
| 1,871,475 | 8/1932 | Smith. | |
| 2,962,996 | 12/1960 | Smith. | |
| 3,009,326 | 11/1961 | Williams | 61—48 |
| 3,024,753 | 3/1962 | Benson. | |
| 3,074,238 | 1/1963 | De Golian | 61—48 |
| 3,152,568 | 10/1964 | Mayer. | |
| 3,210,110 | 10/1965 | Chieger | 61—48 X |

JACOB SHAPIRO, Primary Examiner

U.S. Cl. X.R.

8—9; 52—73, 146; 14—27; 114—.5